United States Patent Office 3,438,950
Patented Apr. 15, 1969

3,438,950
ALKYLATED DERIVATIVES OF VINYL
AROMATIC COPOLYMERS
Edmund B. Davidson, Elizabeth, N.J., assignor to Esso Research and Engineering Company, a corporation of Delaware
No Drawing. Filed Aug. 6, 1965, Ser. No. 477,954
Int. Cl. C08f 27/02, 19/04
U.S. Cl. 260—78.4                                     20 Claims

ABSTRACT OF THE DISCLOSURE

Curable polymers and a process for preparing said polymers which comprises copolymerizing between about 1 and about 25 mole percent of a monovinyl aromatic and between about 99 and about 75 mole percent of a $C_4$–$C_8$ isomonoolefin, at a temperature of between about 0° C. and about —95° C. with a Friedel-Crafts catalyst, and alkylating said isomonoolefin-monovinyl aromatic copolymer with between about 5 and about 20 mole percent of a member of the group consisting of an alpha-beta-unsaturated monocarboxylic acid halide, maleic anhydride and an unsaturated organotrihalosilane, at a temperature of between about 0° C. and about 150° C. with a Friedel-Crafts catalyst in the presence of a polar diluent.

The present invention relates to derivatives of isoolefin-vinyl aromatic copolymers and to a method for making same. In particular, this invention relates to alkylated derivatives of $C_4$–$C_8$ isomonoolefin-monovinyl aromatic copolymers. In one embodiment of the present invention, the aforesaid copolymers are alkylated with an alpha-beta unsaturated monocarboxylic acid halide. In another embodiment, the copolymer is alkylated with maleic anhydride and in still another embodiment, unsaturated organo trihalosilanes, e.g., cyclopentadienyl trichlorosilane, are utilized to alkylate the isoolefin-vinyl aromatic copolymer. More particularly, this invention relates to a process which comprises (1) copolymerizing, a $C_4$–$C_8$ isoolefin, such as isobutene, and a vinyl aromatic, such as styrene, at temperatures below 0° C. with a Friedel-Crafts active metal halide catalyst, and (2) alkylating the resulting copolymer, at temperatures above 0° C., with a member of the group consisting of (a) an alpha-beta unsaturated monocarboxylic acid halide, (b) maleic anhydride, and (c) an unsaturated organo trihalosilane having the formula W—Si—$X_3$, wherein W is selected from the group consisting of $C_2$–$C_6$ alkenyl, $C_5$–$C_6$ cycloalkenyl and $C_5$–$C_6$ cycloalkyldienyl, and X is halogen, with a Friedel-Crafts active metal catalyst, and in the presence of a polar diluent.

It is known that isoolefins can be polymerized to polymers ranging from viscous fluids, having a molecular weight in the area of about 10,000, to dry substantially non-tacky rubbery polymers having molecular weights of 150,000 and higher. It is further known that isoolefins, such as isobutene, and vinyl aromatics, such as styrene, can be copolymerized to products which vary from thermoplastic to rubbery polymers. It has now been found that additional functionality can be incorporated into said copolymer by alkylation of said copolymer with various compounds. Thus, for example, when the isoolefin-vinyl aromatic copolymer is alkylated with an alpha-beta unsaturated monocarboxylic halide, unsaturation is introduced pendant to the copolymer backbone. This alkylated product is sulfur curable and ozone resistant. Similarly, alkylation with an unsaturated organo trihalosilane provides a polymer which has application in the mastics field since such a polymer is moisture curable. The maleic anhydride modified isoolefin-vinyl aromatic copolymer contains, as unsaturation, an alpha-beta conjugated ketone, a carboxylic acid group and the ethylenic unsaturation of the anhydride. This modified copolymer can be cured with sulfur, dimercaptans, diamines or aziridines and also has application as a mastic or plastomer.

In accordance with the present invention between about 99 and about 75 mole percent of a $C_4$–$C_8$ isomonoolefin and between about 1 and about 25 mole percent of a monovinyl aromatic compound are copolymerized at a temperature of between about 0° C. and about —95° C. with a Friedel-Crafts active metal halide catalyst. Upon completion of the copolymerization reaction, the resultant copolymer is alkylated with between about 5 and about 20 mole percent, based on copolymer, of a member selected from the group consisting of (a) an alpha-beta unsaturated monocarboxylic acid halide, (b) maleic anhydride, and (c) an unsaturated organo trihalosilane, defined hereinabove, at a temperature of between about 0° C. and about 150° C. with a Friedel-Crafts active metal halide catalyst and in the presence of a polar diluent.

The exact nature and object of the instant invention will be more clearly perceived and fully understood by referring to the following description and claims.

Copolymers of isoolefins and vinyl aromatics and methods for preparing same have been disclosed in the art. See, for example, U.S. Patents 2,213,423 and 2,274,749. These patents are incorporated herein by reference in their entirety; however, only as much of them as is necessary to understand the present invention will be repeated hereinafter.

The isoolefins employed to prepare the isoolefin-vinyl aromatic copolymer are, in general, $C_4$–$C_8$ isoolefins. Isomonoolefins are preferred. Examples of such isoolefins include: isobutene, 2-methyl-1-butene, 3-methyl-1-butene, 2-methyl-2-butene, 4-methyl-1-pentene, isohexenes, and isooctenes.

The vinyl aromatic compounds employed to prepare the aforementioned copolymers include: styrene, homologs and derivatives thereof. Styrene, which is well known in the art, can be prepared by any one of numerous methods, such as by alkylation of benzene with ethylene and subsequent dehydrogenation of purified ethylbenzene in the presence of steam. Homologs of styrene include those compounds prepared by modifying styrene to incorporate alkyl groups and/or halogen groups. More specifically, the vinyl aromatic compounds of the present process can be depicted structurally by the following formula:

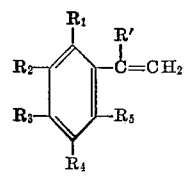

wherein $R'$ is selected from the group consisting of hydrogen or halogen, e.g., chlorine and bromine, and wherein $R_1$, $R_2$, $R_3$, $R_4$ and $R_5$ can be the same or different and are, therefore, each selected from the group consisting of hydrogen, halogen, e.g., chlorine, bromine, fluorine and iodine, and $C_1$–$C_4$ alkyl, e.g., methyl, ethyl, propyl, isopropyl, butyl, secondary butyl and tertiary butyl.

Suitable examples of vinyl aromatic compounds include: styrene, ortho-methyl styrene, meta-methyl styrene, para-methyl styrene, ortho-ethyl styrene, para-ethyl styrene, 2,4-dimethyl styrene, 2,3-dimethyl styrene, 2,5-dimethyl styrene, para-tertiary butyl styrene, ortho-chloro styrene, meta-chloro styrene, 2,4,6-trichloro styrene, mono-, di-, and tri-fluoro styrenes, 1,4-diethyl styrene, 1-methyl-4-chlorostyrene, meta-bromo styrene, ortho-bromo styrene, para-bromo styrene, 2,4-dichlorostyrene, 2,5-dichlorostyrene, 2,6-dichlorostyrene, alpha-chlorostyrene, meta-trifluoro methyl styrene, and/or mixtures thereof.

In general, between about 1 and about 25 mole percent, preferably between about 5 and about 20 mole percent, of the vinyl aromatic compound is copolymerized with between about 99 and about 75 mole percent, preferably between about 95 and about 80 mole percent, of the $C_4$–$C_8$ isomonoolefin.

The Friedel-Crafts active metal halide catalyst employed to copolymerize the $C_4$–$C_8$ isomonoolefin and monovinyl aromatic compound includes all of the metal and metalloid halides conventionally used in Friedel-Crafts catalysis. Generally, any of the Friedel-Crafts catalysts shown by N. O. Calloway in his article on "The Friedel-Crafts Synthesis" printed in the issue of Chemical Reviews, published for the American Chemical Society at Baltimore, in 1935, in Volume XVII, No. 3, the article beginning on page 327, the list being particularly well shown on page 375, can be used. Suitable examples of Friedel-Crafts catalysts include: $SbCl_3$, $SbCl_5$, $SnCl_4$, $AlCl_3$, $AlBr_3$, $BCl_3$, $ZnCl_2$, $FeCl_3$, $TiCl_4$, $TiCl_3$, $ZrCl_4$, $UrCl_4$, $GaCl_4$, $VCl_4$, $BF_3$ $VOCl_3$, etc.

In general, between about 0.1 and about 10 wt. percent, preferably between about 0.5 and about 5 wt. percent, based on total feed, of the Friedel-Crafts catalyst is employed to catalyze the copolymerization reaction.

The solvents used for the aforesaid copolymerization reaction can be any of the solvents or diluents conventionally used for low temperature polymerizations, e.g., the lower alkyl halides. Specific examples include: methyl chloride, methylene chloride, ethyl chloride, methyl bromide, carbon disulfide, vinyl chloride and chloro benzene. The preferred solvent for the present invention is methylene chloride. Hydrocarbon solvents that are liquid at the polymerization temperature can also be used. These include $C_2$ through $C_{16}$ saturated aliphatic and alicyclic hydrocarbons, such as pentane, isopentane, isooctane, methyl cyclohexane, cyclohexane, etc. The amount of solvent or diluent employed can be between about 1 and about 5 volumes of solvent or diluent per volume of mixed copolymerization feed.

The copolymerization reaction temperature can vary between about 0° C. and about −95° C., preferably between about −20° C. and about −60° C. Copolymerization pressures can vary between atmospheric and about 100 p.s.i.g., preferably between atmospheric and about 60 p.s.i.g. However, only that amount of pressure which retains the reaction admixture in a liquid state is, generally, necessary.

The preferred procedure for carrying out the copolymerization reaction is to mix the isoolefin and vinyl aromatic together, cool the admixture down to the desired operating temperature by either external or internal refrigeration, preferably having some diluent or solvent present, and then adding to the reaction mixture the desired amount of catalyst or solution thereof, preferably agitating the mixture well during the addition of the catalyst. The resulting isoolefin-vinyl aromatic copolymer has a number average molecular weight of between about 500 and about 300,000.

After completion of the copolymerization reaction, the resulting copolymer can be recovered by conventional means, stored and later employed in a separate alkylation reaction. However, it is preferred to alkylate the resulting copolymer in the same reaction vessel in which the polymerization reaction took place or in some other suitable reaction vessel in series with the first.

Thus, after completion of the copolymerization reaction, the temperature of the alkylation reaction vessel is set at between about 0° C. and about 150° C., preferably between about 25° C. and about 100° C., and additional Friedel-Crafts catalyst added if necessary, together with a polar diluent and modifying monomer. Alkylation of the copolymer is then carried out with the modifying monomer.

The modifying monomer employed to alkylate the isoolefin-aromatic copolymer in accordance with the present invention is selected from the group consisting of (a) alpha-beta unsaturated monocarboxylic acid halides, (b) maleic anhydride and (c) unsaturated organo trihalosilanes. The unsaturated acid halide can be depicted structurally by the following formula:

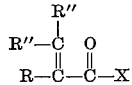

wherein R and R″ are each selected from the group consisting of hydrogen and $C_1$–$C_{10}$ alkyl and X is halogen, e.g. chlorine, bromine and fluorine. Preferably, R is selected from the group consisting of hydrogen and $C_1$–$C_4$ alkyl and R″ is hydrogen. As shown in the above structural formula of the acid halide, the ethylenic unsaturation is alpha-beta to the carbonyl group.

Suitable examples of alpha-beta unsaturated monocarboxylic acid halides include: acrylyl chloride, methacrylyl chloride, methacrylyl bromide, ethacrylyl bromide, beta-beta-dimethyl acrylyl chloride, hexacrylyl chloride, crotonyl chloride, isocrotonyl bromide, angelyl fluoride, hydrosorbyl chloride, alpha-butyl crotonyl chloride, etc.

Maleic anhydride is commercially available and is generally prepared by the catalytic vapor-phase oxidation of benzene.

The unsaturated organo trihalosilanes which can be utilized to modify the isoolefin-vinyl aromatic copolymer can be depicted by the following formula:

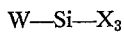

wherein W is an unsaturated hydrocarbon radical selected from the group consisting of $C_2$–$C_6$ alkenyl, $C_5$–$C_6$ cycloalkenyl, and $C_5$–$C_6$ cycloalkyldienyl, preferably $C_2$–$C_3$ alkenyl and $C_5$ cycloalkyldienyl, and X is halogen, e.g., chlorine, bromine, and fluorine, preferably chlorine. The unsaturated organo trihalosilanes can be prepared, for example, by reacting a suitable unsaturated hydrocarbon, e.g., cyclopentadiene, with sodium followed by further reaction with a silicon tetrahalide, e.g., silicon tetrachloride.

Suitable examples of the unsaturated hydrocarbon radical designated as W in the above structure formula, include: vinyl, allyl, 2-propenyl, 3-butenyl, 2-butenyl, 4-pentenyl, 2-pentenyl, 1-butenyl, 3-pentenyl, 5-hexenyl, cyclopentenyl, cyclohexenyl, cyclopentadienyl and cyclohexadienyl. The vinyl, allyl and cyclopentadienyl radicals are preferred.

The amount of modifying monomer, i.e., alpha-beta unsaturated acid halide, maleic anhydride or unsaturated organo trihalosilane, employed in the alkylation reaction is generally between about 5 and about 20 mole percent, based on copolymer. The maximum amount of modifying monomer is determined by the mole percent of monovinyl aromatic comonomer in the copolymer. The lower limit of modifying monomer is determined by the end-use application, i.e., the slower the cure desired, the less modifying monomer incorporated into the copolymer.

A Friedel-Crafts active metal halide catalyst is employed to catalyze the alkylation reaction. The Friedel-Crafts catalyst can be the same or different from the Friedel-Crafts catalyst employed for the copolymerization reaction of the isomonoolefin and monoxinyl aromatic compounds; but will, in general, be the same. The amount of Friedel-Crafts catalyst utilized to catalyze the alkylation reaction can be between about 1 and about 10 wt. percent preferably between about 1 and about 5 wt. percent, based on the amount of modifying monomer employed.

The solvent or diluent employed for the alkylation reaction are polar solvents, such as carbon disulfide and methylene chloride, which are liquid at the alkylation temperature. A polar solvent for purposes of this invention can be defined as a solvent having a dielectric constant of at least 2. See here, Handbook of Chemistry and Physics, 42nd Edition (1960–61), Chemical Rubber Publishing Company. The lower alkyl halides as enumerated hereinabove, can be employed; however, in that case, pressures above atmospheric must be employed for the reason that the lower alkyl halide solvents are gaseous at the alkylation reaction temperature. The preferred polar solvent for the alkylation reaction is methylene chloride.

As mentioned hereinabove, the temperature of the alkylation reaction can be between about 0° C. and about 150° C., but preferably will range between about 25° C. and about 100° C., more preferably, the reflux temperature of the polar solvent. Alkylation pressures can vary from atmospheric to about 100 p.s.i.g.; however, only that amount of pressure which retains the reaction admixture in a liquid state, is necessary.

Although it is not intended to limit the instant invention by a particular theory, it is believed that the modified polymers of the instant invention are prepared by the Friedel-Crafts alkylation of the pendant aromatic group on the substantially linear isomonoolefin-vinyl aromatic copolymer.

A feature of the present invention is that a given base polymer, such as an isobutene-styrene copolymer, can be converted to a variety of products. For example, when the aforementioned isobutene-styrene copolymer is modified with methacrylyl chloride, a product results which is sulfur curable and ozone resistant. Likewise, when this copolymer is reacted or modified with maleic anhydride, the resultant product can be cured under mild conditions with, for example, a diamine. Moreover, when the isobutene-styrene copolymer is modified with an unsaturated organo trihalosilane, such as cyclopentadienyl trichlorosilane, the resultant product cures when exposed to moisture. The latter two products are useful as calks, coatings and as mastics where curing under mild conditions in required.

The inventive process is more particularly described in the examples which are intended as illustrative only since numerous modifications and variations therein will be apparent to those skilled in the art.

EXAMPLE 1

A suitable reaction vessel was charged with 25 ml. of isobutene, 3 ml. of styrene and 150 ml. of methylene chloride. The temperature of the reaction vessel was adjusted to −95° C. and 11 ml. of a catalyst solution prepared by dissolving 0.5 gram of aluminum bromide in 25 ml. of methyl chloride was gradually added to the reaction vessel. Polymerization commenced upon introduction of the catalyst solution and was continued until further addition of the catalyst solution gave no exothermic reaction. At the completion of polymerization, the temperature of the reaction vessel was raised to that of refluxing methylene chloride (40° C.). Thereafter, a clear solution prepared by stirring 7 ml. of methacrylyl chloride, 7 grams of aluminum chloride and 25 ml. of methylene chloride at room temperature (∼23° C.) for ½ hour was added in its entirety to the reaction vessel. Excess aluminum chloride was filtered off prior to introduction into the reaction vessel. Additional methylene chloride (100 ml.) was then added and the reaction mixture refluxed for 1 hour. After cooling to room temperature, the reaction mixture was added to excess methanol to precipitate the resultant polymer product. The product was then recovered and dried in a vacuum oven.

EXAMPLE 2

A portion of the polymer prepared in Example 1 was compounded in accordance with the recipe of Table I. The polymer was then cured for 120 minutes at a temperature of 307° F. Inspections of the physical properties of the cured polymer were performed in accordance with ASTM method D 470. The results of the physical inspections are also tabulated in Table I.

Table I

Compound:
- Polymer _____ parts by weight__ 12
- Philblack O _____ do____ 6
- Zinc Oxide _____ do____ 0.6
- Stearic Acid _____ do____ 0.12
- Sulfur _____ do____ 0.24
- Tuads (methyl) _____ do____ 0.12
- Benzothiazyl Disulfide (Atlax) _____ do____ 0.12
- PX 441 (2,6-di-t-butyl-4-methyl phenol) do____ 0.12

Physical properties:
- Tensile _____ p.s.i__ 1625
- Elongation _____ percent__ 615
- Modulus (300%) _____ p.s.i__ 960

EXAMPLE 3

A copolymer of isobutene and styrene, containing about 10% styrene, was dissolved in methylene chloride to give a 10% solution of copolymer. A 40 ml. aliquot (50 grams) of this solution was placed in a pressure vessel with about 0.1 gram of aluminum chloride and 1 gram of cyclopentadienyl trichlorosilane. The reaction mixture was heated on a steam bath (212° F.) for about 8 hours. At the end of the reaction period, the methylene chloride solvent was evaporated by heating on a steam bath. The resultant product was recovered and exposed to moisture at room temperature (∼23° C.) for several hours. The cured product was insoluble in common organic solvents, thus demonstrating that the cyclopentadienyl silane had combined with the copolymer to form a moisture curable mastic.

EXAMPLE 4

A 40 ml. aliquot of the copolymer solution of Example 3 was placed in a pressure vessel with about 0.34 gram of aluminum chloride and about 0.25 gram of maleic anhydride. The reaction admixture was heated on a steam bath (212° F.) for about 8 hours. After cooling, five drops (0.25 ml.) of triethylene tetramine were added and the methylene chloride solvent evaporated. The resulting product was colored and more plastic than the unmodified copolymer. Furthermore, the product was no longer soluble in common organic solvents, thus indicating that the copolymer had been modified with maleic anhydride and cured.

While there are above described a number of specific embodiments of the present invention, it is obviously possible to produce other embodiments of various equivalent modifications and variations thereof without departing from the spirit of the invention.

Having now set forth the general nature and specific embodiments of the present invention, the true scope is now particularly pointed out in the appended claims.

What is claimed is:

1. A process which comprises (a) copolymerizing (1) between about 1 and about 25 mole percent of a monovinyl aromatic and (2) between about 99 and about 75 mole percent of a $C_4$–$C_8$ isomonoolefin at a temperature of between about 0° C. and about −95° C. with a Friedel-Crafts catalyst and (b) alkylating said isomonoolefin-monovinyl aromatic copolymer with between about 5 and about 20 mole percent of a member of the group consisting of (1) an alpha-beta unsaturated monocarboxylic acid halide, (2) maleic anhydride and (3) an unsaturated organo trihalosilane, at a temperature of between about 0° C., and about 150° C. with a Friedel-Crafts catalyst and in the presence of a polar diluent.

2. The process of claim 1 wherein the alpha-beta unsaturated monocarboxylic acid halide is represented by the formula,

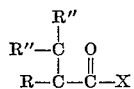

wherein R and R" are each selected from the group consisting of hydrogen and $C_1$–$C_{10}$ alkyl, and X is halogen.

3. The process of claim 2 wherein R is a $C_1$–$C_4$ alkyl, R" is hydrogen, and X is chlorine.

4. The process of claim 1 wherein the unsaturated organo trihalosilane is represented by the formula, $$W\text{—}Si\text{—}X_3\text{—}$$

wherein W is an unsaturated hydrocarbon radical selected from the group consisting of $C_2$–$C_6$ alkenyl, $C_5$–$C_6$ cycloalkenyl and $C_5$–$C_6$ cycloalkyldienyl, and X is halogen.

5. The process of claim 4 wherein W is selected from the group consisting of $C_2$–$C_3$ alkenyl and cyclopentadienyl, and X is chlorine.

6. The process of claim 1 wherein the Friedel-Crafts catalyst is aluminum chloride and the polar diluent is methylene chloride.

7. The process of claim 1 wherein the monovinyl aromatic is styrene and the isomonoolefin is isobutene.

8. The process of claim 1 wherein the alpha-beta unsaturated monocarboxylic acid halide is methacrylyl chloride.

9. The process of claim 1 wherein the unsaturated organo trihalosilane is cyclopentadienyl trichlorosilane.

10. The composition of claim 17 wherein the alpha-beta unsaturated monocarboxylic acid halide is represented by the formula,

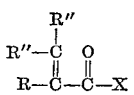

wherein R and R" are each selected from the group consisting of hydrogen and $C_1$–$C_{10}$ alkyl and X is halogen.

11. The composition of claim 10 wherein R is a $C_1$–$C_4$ alkyl, R" is hydrogen, and X is chlorine.

12. The composition of claim 17 wherein the alpha-beta unsaturated monocarboxylic acid halide is methacrylyl chloride.

13. The composition of claim 17 wherein the unsaturated organo trihalosilane is represented by the formula, $$W\text{—}Si\text{—}X_3$$

wherein W is an unsaturated hydrocarbon radical selected from the group consisting of $C_2$–$C_6$ alkenyl, $C_5$–$C_6$ cycloalkenyl and $C_5$–$C_6$ cycloalkyldienyl, and X is halogen.

14. The composition of claim 13 wherein W is selected from the group consisting of $C_2$–$C_3$ alkenyl and cyclopentadienyl, and X is chlorine.

15. The composition of claim 17 wherein the unsaturated organo trihalosilane is cyclopentadienyl trichlorosilane.

16. The composition of claim 17 wherein the isomonoolefin is isobutene and the monovinyl aromatic is styrene.

17. A composition comprising an alkylated copolymer wherein the copolymer is the reaction product of about 99 to about 75 mole percent of a $C_4$–$C_8$ isomonoolefin and about 1 to about 25 mole percent of a monovinyl aromatic, said copolymer being alkylated on the aromatic substituent with about 5 to about 20 mole percent based on said copolymer of a member selected from the group consisting of (1) an alpha-beta-unsaturated monocarboxylic acid halide, (2) maleic anhydride, and (3) an unsaturated organotrihalosilane.

18. A composition comprising an alkylated copolymer wherein the copolymer is the reaction product of about 99 to about 75 mole percent of a $C_4$–$C_8$ isomonoolefin and about 1 to about 25 mole percent of a monovinyl aromatic, said copolymer being alkylated on the aromatic substituent with about 5 to about 20 mole percent based on said copolymer of methacrylyl chloride.

19. A composition comprising an alkylated copolymer wherein the copolymer is the reaction product of about 99 to about 75 mole percent of a $C_4$–$C_8$ isomonoolefin and about 1 to about 25 mole percent of a monovinyl aromatic, said copolymer being alkylated on the aromatic substituent with about 5 to about 20 mole percent based on said copolymer of maleic anhydride.

20. A composition comprising an alkylated copolymer wherein the copolymer is the reaction product of about 99 to about 75 mole percent of a $C_4$–$C_8$ isomonoolefin and about 1 to about 25 mole percent of a monovinyl aromatic, said copolymer being alkylated on the aromatic substituent with about 5 to about 20 mole percent based on said copolymer of cyclopentadienyl trichlorosilane.

References Cited

UNITED STATES PATENTS 2,786,032 3/1957 Hollyday et al.
2,651,628 9/1953 Welch.

JOSEPH L. SCHOFER, *Primary Examiner.*

J. KNIGHT, *Assistant Examiner.*

U.S. Cl. X.R.

260—78.5, 80.71, 80.73, 80.78, 88.2